(12) United States Patent
Kim et al.

(10) Patent No.: US 6,764,623 B2
(45) Date of Patent: Jul. 20, 2004

(54) PROCESS OF MAKING POLYESTER FILAMENTARY YARN FOR TIRE CORDS

(75) Inventors: Sung Joong Kim, Kumi-si (KR); Gi Woong Kim, Kumi-si (KR); Seung Oh Lee, Kumi-si (KR)

(73) Assignee: Kolon Industries, Inc., Kyungki-Do (KR)

( * ) Notice: Subject to any disclaimer, the term of this patent is extended or adjusted under 35 U.S.C. 154(b) by 359 days.

(21) Appl. No.: 09/983,261

(22) Filed: Oct. 23, 2001

(65) Prior Publication Data

US 2002/0041048 A1 Apr. 11, 2002

Related U.S. Application Data

(63) Continuation-in-part of application No. 09/362,377, filed on Jul. 28, 1999, now Pat. No. 6,329,053.

(51) Int. Cl.$^7$ .......................... D01D 1/10; D01D 5/088; D01D 5/12; D01D 10/02; D01F 6/62

(52) U.S. Cl. .................... 264/103; 264/169; 264/210.5; 264/210.8; 264/211.12; 264/211.15; 264/211.17; 264/235.6; 264/342 RE

(58) Field of Search .................... 264/103, 169, 264/210.5, 210.8, 211.12, 211.15, 211.17, 235.6, 342 RE

(56) References Cited

U.S. PATENT DOCUMENTS

| 4,038,357 A | * | 7/1977 | Boyes et al. ................. 264/168 |
| 4,101,525 A | | 7/1978 | Davis et al. |
| 4,195,052 A | | 3/1980 | Davis et al. |
| 5,472,781 A | | 12/1995 | Kim et al. |
| 5,658,665 A | | 8/1997 | Kim et al. |

FOREIGN PATENT DOCUMENTS

JP          6112952 A    1/1986

* cited by examiner

Primary Examiner—Leo B. Tentoni
(74) Attorney, Agent, or Firm—Birch, Stewart, Kolasch & Birch, LLP

(57) ABSTRACT

Polyester multi-filamentary yarn, useful as tire reinforcement, is produced by melting polyester resin at 290° C. or below including at least 90 mol % of polyethylene terephthalate with intrinsic viscosity of 0.7–1.2; filtering the molten resin for filtering retention time of ten minutes or below; spinning the filtered, molten resin by extrusion through a nozzle which has 250–500 holes, each ranging in diameter from 0.5 mm to 1.2 mm with a length/diameter ratio from 2 to 5; primarily quenching the extruded yarn at a temperature of 100–195° C. in a zone of 50 mm or more distance directly below the nozzle; secondarily quenching the yarn with air at its glass transition temperature (Tg) or below; taking off the yarn at spinning stress of 0.3 g/d or greater; drawing taken-off yarn at total draw ratio of 1.3 or greater; and thermally treating the yarn at temperature 150–230° C.

19 Claims, No Drawings

PROCESS OF MAKING POLYESTER FILAMENTARY YARN FOR TIRE CORDS

This application is a Continuation-in-part of application Ser. No. 09/362,377, filed on Jul. 28, 1999, which issued as U.S. Pat. No. 6,329,053B2 on Dec. 11, 2001, the entire contents of which are hereby incorporated by reference and for which priority is claimed under 35 U.S.C. §120.

BACKGROUND OF THE INVENTION

1. Field of the Invention

The present invention relates to an industrial polyester multifilamentary yarn of high modulus and low shrinkage, as a reinforcement for tires, and a dipped cord formed therefrom. More particularly, the present invention relates to a polyester multifilamentary yarn which retains superior dimensional stability and fatigue resistance even at high temperatures and a dipped cord formed therefrom. Also, the present invention is concerned with a method for producing such a polyester multlfilamentary yarn and a dipped cord.

2. Description of the Prior Art

One of the typical functional uses which fibers have is to reinforce rubber composites, such as tires. Examples of the fibers useful as such a reinforcement include nylon, polyester, rayon, etc. Of them, polyester fibers contain benzene rings in their molecular structure, exhibiting a rigid property. Accordingly, tire cords produced from polyester yarns shows high elastic modulus and few flat spots with superiority in fatigue resistance, creep resistance and endurance. By virtue of these high physical properties, polyester is extensively used as a reinforcement for rubber composites, especially tires.

In spite of these advantages, conventional polyester tire cords suffer from a significant disadvantage of reducing the side wall indentation of monoply radial tires. Also, industrial polyester yarns are required to improve in dimensional stability in order to replace the rayon fibers which have been applied for radial tires. In this regard, recent research has been directed to the development of polyester fibers which have high strength and elastic modulus in the same level as that of rayon fibers.

Techniques for increasing thermal stability in polyester fibers are found in, for example, U.S. Pat. Nos. 4,101,525 and 4,195,025 (both to Davis et al.) which disclose a polyester tire cord produced by drawing highly oriented undrawn yarn in a high-speed spinning process under a steaming condition to give highly oriented drawn yarn, especially multi-drawn yarn containing at least 85 mol % of polyethylene terephthalate, which ranges, in denier per filament, from 1 to 20 and, in work loss at 150° C., from 0.004 to 0.02 lb·in, and dipping the multi-drawn yarn in a rubber solution.

Another prior art relating to a tire cord can be acquired from Japanese Pat. Laid-Open No. Sho. 61-12952 which discloses a process for producing a tire cord, comprising the steps of spinning a polyester having an intrinsic viscosity of 1.0, a diethylene glycol content of 1.0 mol %, a carboxyl group content of 10 eq/$10^6$ g at a spinning speed of 2,000~2,500 m/min to obtain undrawn yarn, drawing the undrawn yarn at about 160° C., thermally treating the yarn at 210~240° C., and dipping the yarn in an ordinary rubber solution. In this process, the temperature just below a spinning nozzle ranges from 100 to 450° C. The tire cord thus produced is, however, poor in physical properties. For instance, the tire cord ranges, in absorption peak temperature in amorphous portions, from 148 to 154° C. and, in dry shrinkage, from 3.3 to 5% with a tenacity of at least 7.0 g/d.

Focusing on high tenacity and low shrinkage, as introduced above, the research which was made on the development of the filamentary yarn for tire cords provided methods in which undrawn yarn with a high quantity of orientation and crystallinity is produced through spinning at a high stress and endowed with high tenacity and low shrinkage properties through drawing at a high draw ratio.

The yarns produced by the high-speed spinning or drawing according to the prior arts are improved in fatigue resistance, but problematic in that the molecular chain lengths in amorphous portions are non-uniform and extend. As a result, relaxed molecular chains coexist, giving rise to a great loss in tenacity. Thus, the yarns suffer from significant disadvantages of being poor in drawability owing to a large difference in physical properties between inner and outer layers of the yarn and of exhibiting a great variation in physical properties owing to defects in their micro structure. Moreover, the yarns produced from a highly viscous polymer with an intrinsic viscosity of 1.0 or more show a limit of low shrinkage. Yarns which are drawn with a high orientation in advance of undergoing a tire cord conversion process have a definite two-phase structure of crystalline and amorphous portions. Where the highly oriented yarns are subjected to a thermal treatment by dipping in a rubber solution, deterioration is brought about in the crystalline portion with aggravation in the non-uniformity of the molecular chain, leading to a lowering of strength. As for polyester multi-filamentary yarn, it is highly apt to be damaged because it undergoes a series of after treatment processes. For example, at least two strands of the drawn yarn primarily obtained are subjecting to first and second twisting and formed into a fabric, after which the fabric is dipped in a rubber solution and incorporated into a rubber matrix of a tire, and during these processes, the yarn may be changed in physical properties and undergoes breaking of molecular chains.

SUMMARY OF THE INVENTION

Knowledge of the fact that, in order to use drawn polyester filamentary yarn in tire cords, it is important to allow the drawn yarn to have a uniform structure of molecular chains and the balance of high elastic modulus and low shrinkage than to provide the drawn yarn with high tenacity and low shrinkage because the drawn yarn experiences serious alteration in physical properties and molecular structure, leads to the present invention.

Therefore, it is an object of the present invention to overcome the above problems encountered in prior arts and to provide polyester multi-filamentary yarn for tire cords, which retains excellent thermal stability and fatigue resistance even after thermal aging.

It is another object of the present invention to provide tire cords formed from such polyester multi-filamentary yarn.

It is a further object of the present invention to provide a method for making such polyester multi-filamentary yarn for tire cords.

In order to approach the above objects, first, when making drawn yarn, factors causative of non-uniformity in the molecular chain structure of the yarn must be excluded to as much extent as possible and the balance of high elastic modulus and low shrinkage is provided for the yarn. Next, the drawn yarn is allowed to undergo a uniform structural change in the course of the dipping process and even under the strict conditions of tire manufacturing processes, so that the resulting dipped tire cords are deformed as little as possible under a high temperature condition of the tires, i.e.

tire rotation while the car is driving. Consequently, the tires are superb in endurability.

In other words, the factors which cause non-uniformity in the molecular chain of the yarn are minimized during the producing processes of the drawn yarn while the parameters which are involved in the structural change of the molecular chains of the drawn yarn and dipped tire cords are controlled in the dipping process and tire-manufacturing processes.

There are many factors which are causative of non-uniformity in the molecular chains of polyester yarn. For instance, in the course from the melting of a polyester resin to the step just before the extrusion of the molten polyester from nozzles, the intrinsic viscosity and melting temperature of the polyester resin have an influence on the molecular weight distribution of the molten polymer, together with the retention time which it takes for the molten polymer to flow to the nozzles. Upon extrusion of the molten polymer from the nozzle, the number and the diameter of the nozzles play an important role in determining the uniformity of the resulting yarn. In the processes after the extrusion, such as a quenching process and a winding process, quenching temperatures and winding speeds cause a structural change in both of the inner and outer layers of the yarn extruded from the nozzles (hereinafter referred to as "extruded yarn"), thereby bringing about a significant effect in the molecular chains of the inner and outer layers. During the drawing of the extruded yarn by taking up, the causative factors included the orientation and breakage of the molecular chain. Upon thermal treatment, the relaxation extent of the molecular chain is taken into account. Hence, the formation of a uniform structure in the molecular chain is affected by a variety of factors which are distributed in various process steps from polymer melting through melt spinning, quenching quenching temperature), and drawing to thermal treatment. Since the factors are interconnective to each other, an appropriate combination of the factors is necessary to produce the drawn yarn which has a uniform structure of the molecular chain.

Fundamentally, in order to attain a uniform structure in the molecular chain, the processing conditions at the process steps which are important for the uniformity of the molecular chain are set in such a manner that the occurrence of the non-uniformity is minimized. For instance, it is preferable to minimize the retention time in the melting and filtering steps of a polymer. The non-uniformity due to a sudden change in a quenching step after spinning can be significantly reduced by converting the sudden change into a gradual one. Where the non-uniformity of the molecular chain is due to drawing, it can be solved by conducting the drawing process at a low draw ratio. In addition, a thermal treatment stabilizes the molecular chain.

Accordingly, the present invention can be attained by satisfying the conditions of the problematic process steps simultaneously.

In accordance with an aspect of the present invention, there is provided a process for producing polyester filamentary yarn from a polyester resin which comprises at least 90 mol % of polyethylene terephthalate with an intrinsic viscosity of 0.7~1.2, comprising the steps of: melting the polyester resin at a temperature of 290° C. or below; filtering the molten resin for a filtering retention time of 10 min or below; extrusion-spinning the filtered, molten resin through a nozzle which has 250~500 holes, each ranging, in diameter from 0.5 to 1.2 mm with a length/diameter ratio from 2 to 5; primarily quenching the extruded yarn at a temperature of 100~195° C. in a zone of 50 mm or more distance directly below the nozzle; secondarily quenching the yarn with quench air at its glass transition temperature (Tg) or below; taking off the yarn at a spinning stress of 0.3 g/d or greater; and drawing the taken-off yarn at a total draw ratio of 1.3 or greater and thermally treating the yarn at a temperature of 150~230° C.

The term "filtering retention time" as used herein means the time it takes for the molten resin to travel from the screw end of the extruder to the holes of the nozzle.

In accordance with another aspect of the present invention, there is provided polyester filamentary yarn for tire cords, which comprises at least 90 mol % of polyethylene terephthalate and has an intrinsic viscosity of 0.70~1.2 and a tenacity of 5.5~8.5 g/d with an intermediate elongation difference (E1-E0) between intermediate elongations E0 and E1 amounting to 6% or greater. The intermediate elongation E0 is the elongation under a load of 4.5 g/d while the intermediate elongation E1 is the elongation under a load of 4.5 g/d after conducting a thermal treatment at 177° C. for 10 min under a load of 0.01 g/d. The yarn preferably has an amorphous orientation function of 0.65 or greater and a terminal modulus of 15 g/d or below.

In accordance with a further aspect of the present invention, there is provided a polyester dipped cord which is produced by twisting the polyester filament yarn in at least two strands, forming the strands into a fabric, and treating the fabric with blocked isocyanate and resorcinol formaldehyde latex (RFL), wherein the cord satisfies the following characteristics:

i) a tenacity of 5.0 g/d or greater,
ii) a dimensional stability index ($E_{4.5}$+SR) of less than 7.0%,
iii) a breaking elongation of 9% or greater,
iv) an intermediate elongation difference (E1-E0) of 3% or less.

DETAILED DESCRIPTION OF THE INVENTION

The present invention pertains to polyester filamentary yarn for tire cords, which is uniform in molecular chain and has a harmony of high elastic modulus and low shrinkage with superiority in dimensional stability and fatigue resistance. Suitable for the production of the polyester filamentary yarn according to the present invention is a polyester resin which contains at least 90 mol % of polyethylene terephthalate and has an intrinsic viscosity of 0.7~1.2 and preferably 0.7~0.9.

This resin was melted, filtered and spun by extrusion through a nozzle. The melting of the polyester resin is conducted at a temperature of less than 290° C., preferably at a temperature less than 288° C. and more preferably at a temperature of 285~288° C. During the filtration, the molten resin is treated for a filtering retention time of 10 min or less, preferably 8 min or less. As for the nozzle, it has 250~500 holes, each ranging, in hole diameter, from 0.5 to 1.2 mm with a hole length/hole diameter ratio from 2 to 5.

Next, the extruded yarn is subjected to a primary quenching process in which the yarn passes through a quenching zone of 50 mm or more distance directly below the nozzle, maintained at a temperature of 100~195° C., so that the undrawn yarn is allowed to have a spinning stress of 0.3 g/d or higher.

Subsequently, a secondary quenching process is conducted, in which the extruded yarn is solidified by quenching with quench air at the polymer's glass transition temperature or less.

Thereafter, the undrawn yarn is drawn at a temperature between the Tg and the crystallization temperature of the polymer.

Finally, the drawn yarn is thermally treated at a temperature of 150~230° C.

The polyester filamentary yarn of the present invention preferably comprises polyethylene terephthalate at a content of 90 mol % and more preferably 95 mol %. Correspondingly, other copolyesters than polyethylene terephthalate may be contained at an amount of 10 mol % or less and preferably 5 mol % or less.

In addition to polyethylene terephthalate, useful copolyesters in the present invention may be produced from glycols, such as diethyl glycol, trimethylene glycol, tetramethylene glycol and hexamethylene glycol, and dicarboxylic acids, such as isophthalic acid, hexadihydroterephthalic acid, adipic acid, cebasic acid and azellaic acid.

The polyester filamentary yarn of the present invention usually has a fineness of 3~5 deniers per filament, but these values can be varied in a wide range as is apparent to the skilled in this art.

Where the polyester filamentary yarn of the present invention is incorporated as a reinforcing fiber into a rubber composite such as a tire, the yarn allows the rubber composite to show excellent dimensional stability and toughness. Therefore, the polyester filamentary yarn can efficiently replace the rayon fibers which have recently been used in monoply radial tires. Further, it is expected that the polyester filamentary yarn of the present invention will meet the requirements for a further improvement in the dimensional stability of polyester.

First, when a cord is excessively shrunk during a curing process, a remarkable reduction is brought about in the elastic modulus of the cord. Second, the shrinkage of the cord is closely concerned with the uniformity of the tire. In practice, accordingly, the comparison of elastic modulus at high temperatures with dry shrinkage is regarded as very important in tire cords. An intermediate elongation $E_{4.5}$ (an elongation under a load of 4.5 g/d) and an $E_{4.5}$ growth after the free shrinkage (aging) at a certain sulfurizing temperature are used as measures of compliance. Of the factors to determine the controllability of tires, the elastic modulus at high temperatures is one of the most important parameters.

The polyester multi-filamentary yarn of the present invention consists typically of 200~500 continuous filaments with a fineness of 3~5 deniers per filament, but these values may vary in a large range.

When being applied for dipped cords, the multi-filamentary yarn of the present invention is comparable with rayon, which is usually used as a reinforce material of tires. Particularly, the multi-filamentary yarn of the present invention is useful as an industrial fiber by virtue of its high tenacity and toughness even in a high temperature condition of 100° C. or greater and low shrinkage.

Suitable as the starting material for the production of the multi-filamentary yarn of the present invention is a polyester which has an intrinsic viscosity ($\eta$) of 0.7~1.2 and preferably 0.7~0.9. The intrinsic viscosity may be calculated from the following equation by determining the relative viscosity ($\eta_r$) of a solution of 8 g of a sample in 100 ml of ortho-chlorophenol at 25° C., using an Oswald viscometer.

$$\eta = 0.042\, \eta_r + 0.2634$$

$$\eta_r = \frac{t \times d}{t_0 \times d_0}$$

wherein
t=dropping time of solution (sec),
$t_0$=dropping time of ortho-chlorophenol (sec)
d=density of solution (g/cm³) and
$d_0$=density of ortho-chlorophenol (g/cm³).

Since the polymerization quantity of a polymer, if it is a kind of a molecular weight, has the same concept as intrinsic viscosity, the polymerization quantity is closely connected with the conformational stability and fatigue resistance of the polymer. In detail, the lower the molecular weight of a polymer is, the more advantageous the polymer is in terms of conformational stability. On the other hand, as a polymer has a higher molecular weight, the polymer is more advantageous in fatigue resistance. In the present invention, an excellent conformational stability is secured by use of a polymer which has a relatively low intrinsic viscosity ranging from 0.7 to 1.2. Simultaneously, the degradation in fatigue resistance was minimized by spinning the polymer at such a temperature of 288° C. or less and particularly, 285~288° C. as to prevent the reduction of its molecular weight.

The spinning nozzle useful in the present invention has 250~500 holes, in total, each of which has a diameter of 0.5~1.2 mm and preferably 0.8~1.0 mm and a length/diameter ratio of 2~5 and preferably 3~5. Where a spinning process is carried out in the manner of 2Cop winding after 4 ends spinning, the number of holes preferably ranges from 120 to 250 per one end. In this case, doubling is conducted after quenching. For the one-shot spinning in which 2Cop winding is performed after 2ends spinning, 250~450 holes preferably exist in one nozzle.

In order to obtain highly oriented, undrawn yarn, it is important to raise the spinning stress of the undrawn yarn to 0.3 g/d or higher. This is affected by the magnitude of the tension which the extruded yarn undergoes upon reaching the glass transition temperature by cooling with quench air. In turn, the magnitude of tension depends on the spinning speed, the discharge quantity of per opening, the temperature of the atmosphere just below the nozzle, and the temperature of the quench air.

Hence, the tension of the undrawn yarn is determined in the point where the extruded yarn from the spinneret reaches a temperature below the glass transition temperature by cooling with quench air. In the present invention, there is provided a technique of heightening the spinning speed to increase the speed of tensile deformation of the extruded yarn in addition to raising the spinning stress even at the same spinning speed by controlling the temperature of the atmosphere just below the nozzle. In addition to minimizing the frequency of cut or broken fibers, this technique allows the raising of the spinning stress of the undrawn yarn, leading to the production of highly oriented, undrawn yarn.

In accordance with the present invention, the extruded yarn is primarily cooled in a quenching zone of 50 mm or more distance directly below the nozzle, preferably in a quenching zone extending from a 50 mm-distant point to a 250 mm-distant point from the nozzle, more preferably from a 50 mm-distant point to a 150 mm-distant point, which is maintained at a temperature of 100~195° C., preferably 100~180° C. and more preferably 100~150° C.

Typically, a shroud which heats the atmosphere just below the nozzle to the nozzle temperature or higher is set to reduce the orientation quantity of the undrawn yarn, so as to achieve high draw ratios at which the undrawn yarn is drawn to produce yarn of high tenacity. However, the resulting yarn suffers from high thermal shrinkage. If the spinning is conducted at a high speed while keeping the shroud at high temperatures in order to improve the dimensional stability, a steep deformational gradient is brought about in the polymer, frequently causing fiber to be cut or broken and giving rise to a sudden decrease in the production efficiency.

After completion of the primary cooling process, the filamentary yarn is subjected to a secondary cooling treatment with quench air. The cooling is preferably carried out at a temperature of 20° C. to the glass transition temperature of the polymer and preferably 40~50° C. In the temperature range, the temperature difference the inner and outer layers of the filament at the solidification point can be reduced. Accordingly, a tenacity reduction attributable to the structural difference between the inner and outer layers of the filament can be minimized. In addition, alleviating the deformational gradient of the polymer improves its spinning property, so that the molten polymer shot from the nozzle by spinning under a high stress condition has an alleviated deformational gradient, thereby minimizing the non-uniformity of physical properties and the occurrence of broken filaments.

If non-uniformity happens in the filament upon quenching, a significant decrease in the tenacity of the yarn is caused after drawing, making it virtually impossible to achieve an excellent dimensional stability as well as high tenacity by use of low viscosity polymers.

In the present invention, the undrawn yarn thus obtained is wound in such a manner that the yarn has a spinning stress of 0.3 g/d or greater and more preferably 0.5~0.8 g/d. The winding is conducted at a speed of 2,500 m/min or higher and more preferably 2,700~3,500 m/min. Subsequently, the wound yarn is drawn at a low draw ratio and at a temperature ranging from the glass transition temperature to the crystallization temperature of the undrawn yarn.

A multi-step drawing process is preferably used in the present invention. Since the crystallization temperature of a highly oriented undrawn yarn produced by a high-speed spinning process is usually lower by 10° C. or more than that of an undrawn yarn obtained by a low-speed spinning process, the drawing temperature is preferably adjusted to a range of 120° C. or below, more preferably 70~120° C. and most preferably 70~100° C. For example, if the drawing temperature exceeds 120° C., fine crystals are already formed before the orientation of the molecular chains, degrading the drawability of the yarn and, in an extreme case, breaking the molecular chains. On the other hand, if the drawing is conducted at a temperature less than 70° C., the molecular chains lose their mobility so that the drawing efficiency is lowered.

With the aim of providing the yarn with a tenacity of at least 5.0 g/d, the total ratio is controlled to be in the range of 1.3:1~2.0:1 and preferably 1.3:1~1.6:1. For example, where the total draw ratio is below 1.3:1, the resulting fiber is poor in tenacity. On the other hand, if the ratio is over 2.0:1, high modulus values and low shrinkage cannot be attained with a high percentage in tenacity reduction.

As for the multi-step drawing process, the drawing is preferably conducted so as to achieve about 70% or less of the total draw ratio in the first drawing zone. For example, if more than 70% of the total draw ratio is accomplished in the first drawing zone, the period of time which it takes for the tangled molecular chains to attain a fibrillar structure is so short that parts of the molecular chains still remain tangled. Serving as a structural defect, the tangled molecular chains gives rise to an increase in thermal shrinkage.

In the present invention, advantage is taken of the characteristic properties of the highly oriented undrawn yarn produced by the high-speed spinning process, e.g., the properties in which the undrawn yarn is transformed into a liquid-like form rather than undergoes shrinkage when it is thermally treated under a specific condition after the drawing, so as to greatly decrease the shrinkage of the dipped cord.

The elongation and shrinkage behavior upon heat application can be thought to result from the difference of elongation power due to the crystallization of the oriented amorphous molecular chains. Accordingly, the present invention utilizes the mechanism of the elongation and shrinkage behavior in minimizing the shrinkage.

The intensive and thorough research, repeated by the present inventors, resulted in the finding that, in order to maximize the water-like elongation behavior, crystallization by heat should not occur during the drawing. To this end, the drawing is conducted at a temperature lower than the crystallization temperature of the undrawn yarn and at a low draw ratio. In the case that crystallization by heat occurs, in advance, in the drawing process, the oriented amorphous portions are transformed into crystalline portions and therefore, the elongation transformation which usually occurs as the oriented amorphous portions are changed to oriented crystals no longer occurs. There occurs only the shrinkage behavior ascribed to the disorientation of the amorphous molecular chains which are present in the amorphous portions, leading to an increase of dry shrinkage.

A characteristic of the present invention is to thermally treat the drawn yarn. Because the yarn whose orientation is almost completely finished is subjected to thermal treatment, the structure of the yarn is dependent greatly on the temperature. The thermal treatment is carried out at a temperature of 150~230° C. and preferably 150~180° C. For example, if the temperature is higher than 210° C., there exists a clear discrimination between the amorphous portions and the crystalline portions, so that the orientation quantity of the crystalline portions is extremely increased while the amorphous portions are decreased. As a result, the degradation of physical properties due to abnormal crystal growth cannot be minimized in a subsequent dipping process. Upon the thermal treatment, the yarn may be relaxed at a quantity of 2% or greater.

In general, the undrawn yarn attains the characteristic properties of the finally produced yarn as a consequence of the crystallization and orientation of molecular chains when the undraw yarn undergoes a drawing process. The orientation in the course of the drawing takes place in both of the crystalline and amorphous portions and the drawing tension of the amorphous portions are higher than that of the crystalline portions.

According to the method of the present invention, there can be produced filamentary yarn which has an intrinsic viscosity of 0.70~1.2 and preferably 0.7~0.9, a tenacity of 5.5~8.5 g/d and more preferably 5.5~7.5 g/d with an intermediate elongation difference (E1−E0) between intermediate elongations E0 and E1 amounting to 6% or greater, preferably 6~15% and more preferably 6~10%.

Because of the interconnection among the above properties, the filamentary yarn must satisfy all of the properties in order to afford a tire cord which exhibits the desirable characteristics. In particular, the intermediate elongation difference (E1−E0), which is one of the most important indexes to inform the uniformity of the molecular chains during the production of the drawn yarn, must be in a range of 6% or greater with which the molecular chains continue to be uniformly changed in subsequent dipping and tire-manufacturing processes. In this range, the molecular chain structure of the drawn yarn is converted into a uniform one in the dipping process which is executed at a high temperature under a tension condition. If the difference E1–E0 is less than 6%, non-uniformity may be brought about in the molecular chain structure when the dipping process is carried out at a high temperature under a high tension condition.

As high as 0.65 in the amorphous orientation function (fa) of the yarn allows the yarn to be improved in tenacity in the dipping process. More preferably, the yarn has an amorphous orientation degree (fa) of 0.65~0.8. In addition, in order to bring about a more uniform molecular chain in the yarn in the dipping process, it is preferable to set the terminal modulus of the yarn in a range of 15 g/d or below.

Most of the accumulated stresses in the yarn are attributed to the heat which is used in the drawing and thermal treatment. In order to reduce such stresses, the orientation quantity of the amorphous portion was decreased to 0.6 as disclosed in U.S. Pat. Nos. 4,101,515 and 4,195,052. Even in this case, however, constrained amorphous molecular chains cannot be sufficiently released owing to the folded molecular chains on the crystal surface and a large amount of defects on the crystal interface, and it is not easy to obtain high elastic properties due to the decrease of the proportion of tie molecules.

The filaments according to the present invention are twisted in more than two strands on the basis of a fineness of 1,000~2,000 deniers and formed into a fabric, after which the fabric is dipped in a conventional adhesive solution such as RFL (resorcinol-formaldehyde-latex). After being dried, the dipped fabric is thermally treated at a certain temperature under a tension condition, followed by normalizing the fabric to give dipped cord cloth. The term "dipped cord" as used herein means the warp cord constituting the dipped cord cloth. In the dipped cord cloth, the weft serves only to secure the distance between the warp cords. Therefore, the characteristics of dipped cord cloth are represented mainly by those of the warp cord. The same is true of the present invention.

The tire cord which is obtained by use of the filament of the present invention has a dimensional stability index of 7% or less and preferably 6%, a tenacity of 5.0 g/d or greater and preferably 5.5~7.5 g/d, and a breaking elongation of 9% or more, and more preferably 15~20% with the intermediate elongation difference E1–E0 amounting to 3% or less, preferably 2% or less and more preferably 1% or less.

As retaining excellent dimensional stability and fatigue resistance even under a high temperature condition, the dipped cord of the present invention can be applied for rubber composites, such as tires.

The physical properties described above were measured according to the following methods:

tenacity and elongation: samples 250 mm long were tested at a tensile speed of 300 mm/min under the atmospheric conditions of 25° C. and 65% RH by use of a low-speed elongation type tensile strength tester, commercially available from Instron Co., Ltd., in accordance with JIS-L 1017 (1983).

intermediate elongation of yarn ($E_{4.5}$): the elongation value at a load of 4.5 g/d on an elongation load curve obtained by use of the tensile strength tester in accordance with JIS-L 1017. E0 is an intermediate elongation under a load of 4.5 g/d while E1 is an intermediate elongation under a load of 4.5 g/d after a thermal treatment for 10 min at 177° C. under a load of 0.01 g/d.

intermediate elongation growth: E1–E0.

intermediate elongation of dipped cord and its growth: the same procedure as in the yarn was repeated.

terminal modulus of yarn: on a tenacity-elongation curve, the increase of the tenacity ($\Delta T(g/d)$) between a braking elongation (E(%)) and a certain point (E-2.4) is obtained. A terminal modulus is calculated from the following equation.

$$\text{Terminal Modulus }(Mt) = \frac{\Delta T}{2.4 \times 10^{-2}}(g/d)$$

dry shrinkage of cord (SR): the value calculated from the following equation wherein $I_0$ was the length of the cord fabric measured under a dead weight load of 20 g after it was placed at 25° C., 65% RH for more than 24 hours and $I_1$ was the length after it was placed in an oven at 150° C. for 30 min under a dead weight load of 20 g.

$$SR(\%) = \frac{l_0 - l_1}{l_0} \times 100$$

thermal stability index: the intermediate elongation plus the dry shrinkage of cord.

amorphous orientation function (fa): calculated from the following equation (1):

$$fa = \frac{\Delta n - x'_c f'_c \Delta n_c}{(1-x_c)\Delta na} \tag{1}$$

where
 $\Delta n_c$=intrinsic birefringence of crystal (0.220)
 $\Delta n_a$=intrinsic birefringence of amorphous (0.275). The birefringence ($\Delta n$) may be calculated from the following equation (2) by measuring the retardation obtained from the interference fringe by the sample using a Berek compensator mounted in a polarizing light microscope, $$\Delta n = R/d \tag{2}$$

where
 d=thickness of sample (nm)
 R=retardation (nm).
 crystallinity (Xc): determined from the following equation using the density (P, unit: g/cm³) of the yarn.

$$X_c = \frac{\rho_c(\rho - \rho_a)}{\rho(\rho_c - \rho_a)}$$

where,
 ρc (g/cm³)=1.445
 ρa (g/cm³)=1.335
 The density (ρ) may be determined by measurements according to density gradient column method using n-heptane and carbon tetrachloride at 25° C.
 spinning stress: measured between an oiling device and a first godet roller with the aid of a tension meter.

A better understanding of the present invention may be obtained in the light of the following examples which are set forth to illustrate, but are not to be construed to limit the present invention.

EXAMPLES 1 TO 5 AND COMPARATIVE EXAMPLES 1 TO 4

Polyester chips with an intrinsic viscosity of 0.65, which were prepared by solid polymerization, were melt-spun through a spinneret which contained 300 holes (hole diameter 0.60 mm) under the conditions indicated in Table 1, below. The molten resin were filtering for filtering retention time of 8 min. A shroud 200 mm long was placed immediately below the spinneret to provide various temperature conditions as shown in Table 1. In a quenching zone, solidification was performed with secondarily quenching air of 40° C. which moved at a speed of 0.6 m/sec while the undrawn yarn was taken off at a speed of 3,000 m/min. Subsequently, the undrawn yarn was drawn in a two-step drawing process at 80° C. and 100° C. (total draw ratio 1.60 times) using a godet roller. On the godet roller, the yarn was thermally treated at various temperatures as indicated in Table 1. While being relaxed at a quantity of 2%, the yarn 1,000 deniers in fineness was wound on a winder.

The physical properties of the yarn obtained from each example were shown in Table 2, below.

Two strands of the yarn obtained from each examples were subjected to first twisting and second twisting, respectively, at 480 TPM and dipped in RFL at 245° C. to give dipped cords. The physical properties of the dipped cords are shown in Table 3, below.

TABLE 1

| Nos. of Exemp. | Intrin. Viscos. of Chips | Spinning Temp. (C.) | Primarily quenching Temp. (C.) | Spring of undrawn yarn (g/d) | Thermally treated Temp. (C.) |
|---|---|---|---|---|---|
| Exmp. 1 | 0.75 | 282 | 100 | 0.35 | 190 |
| Exmp. 2 | 0.75 | 282 | 190 | 0.32 | 190 |
| Exmp. 3 | 0.85 | 284 | 150 | 0.42 | 200 |
| Exmp. 4 | 0.85 | 284 | 195 | 0.40 | 200 |
| Exmp. 5 | 0.95 | 288 | 150 | 0.55 | 200 |
| C. Exmp. 1 | 0.70 | 295 | 250 | 0.25 | 230 |
| C. Exmp. 2 | 0.95 | 300 | 250 | 0.34 | 230 |
| C. Exmp. 3 | 0.95 | 300 | 320 | 0.32 | 230 |
| C. Exmp. 4 | 1.10 | 305 | 320 | 0.41 | 230 |

TABLE 2

| Nos. of Exmp. | Tenac. (g/d) | Break. Elong. (%) | Term. Modul. (g/d) | Amorph. Orient. Degree (fa) | Intrin. Viscos. of yarn | Itermed. Elong. Growth (%) |
|---|---|---|---|---|---|---|
| Exmp. 1 | 5.8 | 15.8 | 2.5 | 0.81 | 0.71 | 11.8 |
| Exmp. 2 | 5.8 | 15.5 | 2.0 | 0.78 | 0.70 | 13.2 |
| Exmp. 3 | 7.0 | 16.0 | 12.0 | 0.75 | 0.82 | 10.5 |
| Exmp. 4 | 7.0 | 16.0 | 10.8 | 0.69 | 0.82 | 8.1 |
| Exmp. 5 | 7.0 | 15.8 | 12.9 | 0.75 | 0.92 | 6.9 |
| C. Exmp. 1 | 5.4 | 12.9 | 26.6 | 0.62 | 0.64 | 4.2 |
| C. Exmp. 2 | 6.8 | 12.2 | 32.0 | 0.64 | 0.88 | 5.7 |
| C. Exmp. 3 | 6.9 | 12.5 | 32.8 | 0.64 | 0.88 | 5.3 |
| C. Exmp. 4 | 7.5 | 12.3 | 34.9 | 0.63 | 0.95 | 4.8 |

TABLE 3

| Nos. of Exmp. | Physical Prop. of dipped Cords | | | | Intermed. | Remarks |
| | tenacity (g/d) | $E_{4.5}$ | SR | ES | Elong. Growth (%) | |
|---|---|---|---|---|---|---|
| Exmp. 1 | 5.2 | 3.5 | 2.3 | 5.8 | 2.6 | — |
| Exmp. 2 | 5.2 | 3.5 | 2.5 | 6.0 | 2.3 | — |
| Exmp. 3 | 6.2 | 3.5 | 2.8 | 6.3 | 2.6 | — |
| Exmp. 4 | 6.2 | 3.5 | 3.0 | 6.5 | 2.8 | — |
| Exmp. 5 | 6.3 | 3.5 | 3.1 | 6.6 | 3.0 | — |
| Exmp. 1 | 4.7 | 3.5 | 3.0 | 6.5 | 3.8 | Greatly |
| Exmp. 2 | 5.3 | 3.5 | 4.0 | 7.5 | 5.6 | reduced |
| Exmp. 3 | 5.5 | 3.5 | 4.0 | 7.5 | 5.3 | yarn |
| Exmp. 4 | 5.9 | 3.5 | 4.3 | 7.8 | 5.2 | tenacity |

Taken together, the data obtained in the examples and comparative examples demonstrate that the filamentary yarn and dipped cords of the present invention show a harmony of high elastic modulus and low shrinkage in addition to being superior in dimensional stability and fatigue resistance. Consequently, the filamentary yarn and dipped cords of the present invention can be used as reinforcements for rubber composites such as tires.

The present invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A process for producing polyester filamentary yarn for tire cords from a polyester resin, comprising the steps of:
   melting at a temperature of 290° C. or below a polyester resin comprising at least 90 mol % of polyethylene terephthalate with an intrinsic viscosity of 0.7–1.2;
   filtering the molten resin for a filtering retention time of 10 min or below;
   spinning the filtered, molten resin by extrusion through a nozzle which has 250–500 holes, each ranging, in diameter, from 0.5 to 1.2 mm with a length/diameter ratio from 2 to 5;
   primarily quenching the extruded yarn at a temperature of 100–195° C. in a zone of 50 mm or more distance directly below the nozzle;
   secondarily quenching the yarn with quench air at its glass transition temperature (Tg) or below;
   taking off the yarn at a spinning stress of 0.3 g/d or greater;
   drawing the taken-off yarn at a total draw ratio of 1.3 or greater; and
   thermally treating the yarn at a temperature of 150–230° C.

2. A process as set forth in claim 1, wherein the polyester resin has an intrinsic viscosity of 0.7–0.9.

3. A process as set forth in claim 1, wherein the polyester resin is melted at a temperature less than 288° C.

4. A process as set forth in claim 3, wherein the polyester resin is melted at a temperature of 285–288° C.

5. A process as set forth in claim 1, wherein the spinning step is conducted in the manner of 2 Cop winding after 4 ends spinning and the nozzle contains 120–250 holes per one end.

6. A process as set forth in claim 1, wherein the spinning step is conducted in the manner of 2 Cop winding after 2 ends spinning and the nozzle contains 250–400 holes per one end.

7. A process as set forth in claim 1, wherein each of the holes ranges, in diameter, from 0.8 to 1.0 mm and, in length/diameter, from 3 to 5.

8. A process as set forth in claim 1, wherein the primarily quenching step is conducted in a quenching zone extending from a 50 mm-distant point to a 250 mm-distant point from the nozzle.

9. A process as set forth in claim 8, wherein the primarily quenching step is conducted in a quenching zone extending from a 50 mm-distant point to a 150 mm-distant point from the nozzle.

10. A process as set forth in claim 1, wherein the primarily quenching step is conducted at a temperature of 100–180° C.

11. A process as set forth in claim 10, wherein the primarily quenching step is conducted at a temperature of 100–150° C.

12. A process as set forth in claim 1, wherein the secondarily quenching air is maintained at a temperature of 40–50° C.

13. A process as set forth in claim 1, wherein the taking off step is conducted at a spinning stress of 0.5–0.8 g/d.

14. A process as set forth in claim 1, wherein the taking off step is conducted at a winding speed of 2,500 m/min or greater.

15. A process as set forth in claim 14, wherein the taking off step is conducted as a winding speed of 2,700–3,500 m/min.

16. A process as set forth in claim 1, wherein the drawing step is conducted at a drawing temperature of 120° C. or below.

17. A process as set forth in claim 16, wherein the drawing step is conducted at a drawing temperature of 70–120° C.

18. A process as set forth in claim 1, wherein the thermally treating step is carried out at a temperature of 150–180° C.

19. A process as set forth in claim 1, wherein the thermally treating step is carried out while relaxation is provided at quantity of 2% or greater.

* * * * *